United States Patent [19]

Kang et al.

[11] Patent Number: 4,630,300
[45] Date of Patent: Dec. 16, 1986

[54] FRONT-END PROCESSOR FOR NARROWBAND TRANSMISSION

[75] Inventors: George S. Kang, Silver Spring, Md.; Stephanie S. Everett, Alexandria, Va.; Alexander F. Thornhill, Accokeek, Md.

[73] Assignee: United States of America as represented by the Secretary of the Navy

[21] Appl. No.: 539,214

[22] Filed: Oct. 5, 1983

[51] Int. Cl.⁴ .............................................. G10L 5/00
[52] U.S. Cl. ...................................................... 381/31
[58] Field of Search .................................... 381/29–50; 375/122

[56] References Cited

U.S. PATENT DOCUMENTS 3,914,554 10/1975 Seidel ............................ 179/15.55 R
4,255,620  3/1981 Harris et al. ......................... 381/29
4,303,803 12/1981 Yatsuzuka ............................ 381/31
4,360,708 11/1982 Taguchi et al. ............... 179/15.55 R Primary Examiner—E. S. Matt Kemeny
Attorney, Agent, or Firm—Sol Sheinbein; William T. Ellis

[57] ABSTRACT

Bandwidth compression of speech signals is done by aliasing the fricative-sound signals (4–8 KHz) into the voiced-sound signal band for transmission (0–4 KHz). To minimize distortion, aliasing (foldover) is done only when the fricative band power is more than twice the voice band power.

18 Claims, 4 Drawing Figures

FRONT-END PROCESSOR FOR NARROWBAND TRANSMISSION

BACKGROUND OF THE INVENTION

The present invention relates generally to the field of voice processing, and more particularly, to narrowband voice communication systems. Narrowband analog systems generally utilize analog voice transmitters with a limited transmission channel bandwidth (telephones, AM radios, CB and HAM radios, etc.). Narrowband digital systems generally take the form of digitally encoded voice transmitters with a limited front-end bandwidth (voice coders, often called VOCODERS).

The transmission bandwidth of analog voice systems is typically 3 kilo-Hertz (kHz). The front-end bandwidth in digital voice systems is typically about 4 kHz. This is a reasonable compromise between the requirements for intelligible speech and the reduction of the data rate. However, while a bandwidth of three to four kHz is adequate for the reproduction of intelligible vowels, it is not high enough for most of the voiceless fricatives, whose frequency spectra are concentrated above 4 kHz. Examples of voiceless fricative or sibilant sounds are /s/, /sh/ and /ch/. FIG. 1A illustrates the frequency response when certain words are pronounced, some with fricative sounds. It can be seen that a greater portion of the fricative spectra energy is above 4 kHz than below.

The use of a broader front-end bandwidth would be a simple solution for digital voice systems, but would lead to an undesirable increase in the data rate. Likewise, the use of transmission media having a broader bandwidth would be a simple solution for analog voice systems, but such a solution is often not available. In analog voice systems, the problem has been solved in part, by the use of a carbon microphone, which spreads the frication noise throughout the spectrum by the random modulation of the electric resistance caused by the movement of the carbon granules. However, the rest of the speech signal from the carbon microphone is distorted as well.

OBJECTS OF THE INVENTION

It is an object of the present invention to improve the voice quality of narrowband transmission systems.

It is a further object of the present invention to enhance the voiceless sibilant or fricative sounds such as /s/, /sh/, and /ch/ in a narrowband voice transmission system.

It is yet a further object of the present invention to improve the quality and intelligibility of narrowband speech by spreading the spectra of voiceless fricative sounds into the passband of a narrowband communication system.

SUMMARY OF THE INVENTION

Briefly, the above and other objects are achieved in a front-end processor for use with a narrowband voice transmission system comprising an input circuit for receiving an electrical signal representing a voice signal; a circuit for comparing a parameter such as the voltage or power of the electrical voice signals to the voltage or power of the electrical voice signals within the narrow passband and generating a control signal therefrom; and a circuit for spreading the spectra of a portion of the electrical voice signals above the passband into the voice transmission system passband in accordance with the control signal if the total voltage or power of the signal taken from the input circuit to the voltage or power within the passband has at least a predetermined ratio.

In a more specific embodiment, the present front-end processor may be implemented by an input circuit; a frequency filter circuit with a bandwidth which is variable in accordance with a control signal between the given passband and a bandwidth including the passband and a frequency band above said passband; a circuit for determining when the voiceless fricative sounds above the passband exceed the sounds within the passband by a predetermined amount and generating a control signal in accordance therewith to change the bandwidth of the frequency filter circuit; and a circuit for folding some of the spectra of the voiceless fricative sounds above the passband into the passband by means of the aliasing effect when the frequency filter circuit is controlled to have the bandwidth including the passband and the frequency band above the passband.

In one embodiment which is especially amenable to digital implementation, the frequency filter circuit comprises a first passband filter with a bandwidth approximately the same as the passband for filtering the signal from the input circuit; and second filter with a bandwidth including the passband and frequency band above and contiguous with the passband for filtering the signal for the input circuit; and a circuit for switching the output from one or the other of the first and second filters to the spectra folding circuit. The spectra folding circuit may be formed simply by a sampling circuit for sampling at the Nyquist rate for the passband.

In a further embodiment, the frequency filter circuit may be formed by a clocked low pass filter; and a circuit for generating a first clock signal for clocking the clocked low pass filter to have a cutoff frequency at the top frequency of the passband, and for generating a second clock signal for clocking the clocked low pass filter to have a cutoff frequency to include a band of frequencies above the top frequency of the passband; and a switching circuit for switching one or the other of the first and second clock signals to the clocked low pass filter in accordance with the control signal from the determining circuit.

DETAILED DESCRIPTION OF THE PREFERRED EMBODIMENT

The present invention improves the quality and intelligibility of narrowband speech by spreading the sibilant or fricative sound spectra into the passband of the narrowband system. This spectra spreading is accomplished by exploiting the aliasing effect normally suppressed as a contributor to distortion. As is well known in sampled data systems, any frequency F higher than one-half the sampling frequency S is interpreted after the sampling process as S−F Hz. This effect is known as aliasing, and is in essence, the folding of the higher frequencies into the passband. In prior art communications systems, the sampling circuit is always preceded by a low-pass filter which removes spectral components with frequencies greater than one-half the sampling frequency in order to prevent aliasing.

The present invention however, intentionally utilizes the aliasing effect to fold back the high frequency spectra of fricative sounds into the passband. Whenever a voiceless fricative sound is detected, the bandwidth of the low pass filter preceding the standard sampling circuit is increased to greater than ½ the sampling frequency thereby passing the high frequency spectra of the fricative sounds to the sampling circuit. In the sampling process effected by the sampling circuit, these high frequency spectra are then folded back into the passband.

Figure 2:
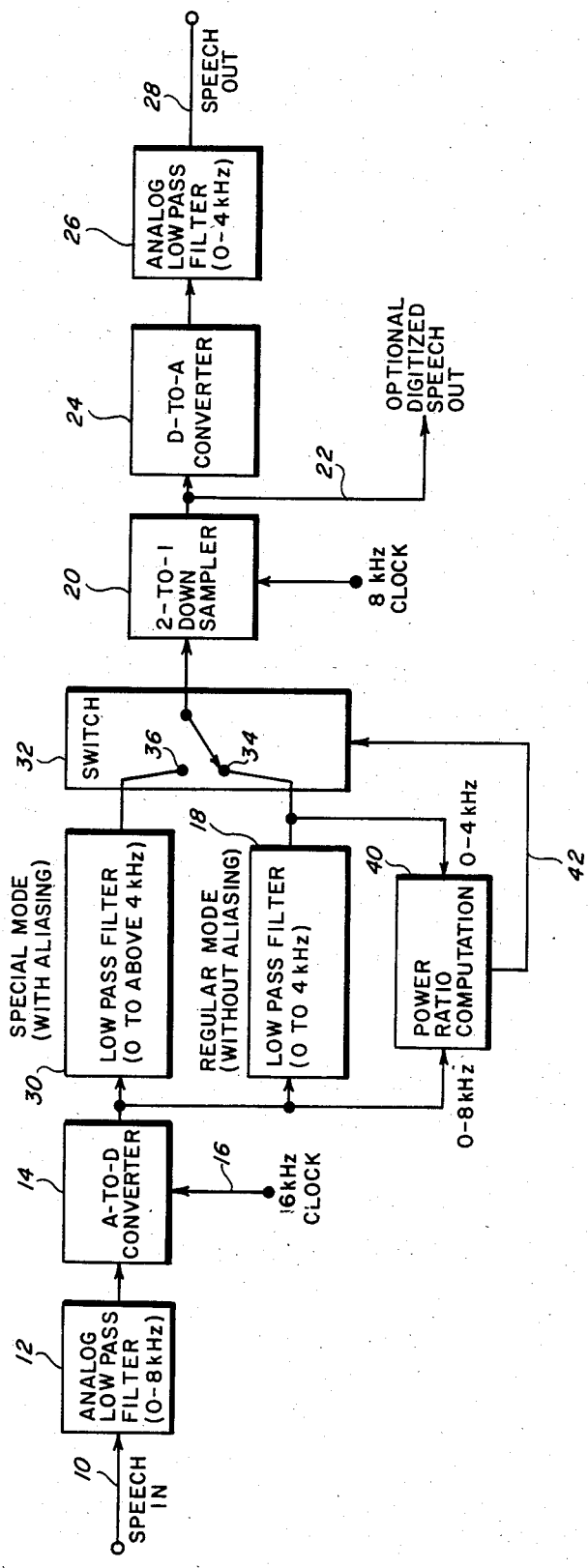
FIG. 2 is a schematic block diagram of one embodiment of the present invention.

Referring now to the drawings, wherein like reference characters designate like or corresponding parts throughout the views, FIG. 2 illustrates one embodiment of the present invention. This embodiment may be implemented in either digital or analog form. It is assumed for purposes of illustration, that the passband for the narrowband voice transmission system is 0–4 kHz. It is understood of course that this passband may take a variety of widths and frequency locations.

With reference to FIG. 2, electrical signals representing input speech, possibly from some form of microphone, are applied on line 10 to an analog low pass filter 12. In the present example using a 0–4 kHz passband, the bandwidth for the analog filter 12 is 0–8 kHz. This bandwidth is double the bandwidth of the desired narrow passband. If this circuit is to be a digital implementation, the output from the analog low pass filter may be applied to an analog-to-digital converter 14. In order to accurately convert the entire 0–8 kHz spectra passed by filter 12, the A-to-D converter 14 should be clocked with a sampling frequency of twice the highest frequency passed by the filter 12, i.e. 16 kHz. This clock signal input is represented by line 16. A standard low pass filter 18 with a bandwidth of 0–4 kHz follows the A-to-D converter 14 and comprises the regular mode filter. This low pass filter 18 typically has the same bandwidth as the passband for the system for the narrowband system to follow the present circuit. The output from this low pass filter 18 is applied via a switch 32 to a sampler 20 which effects the sampling operation. The output from the sampler 20 may be taken directly as a digitized speech output on line 22 or applied through a digital-to-analog converter 24 and an analog low pass filter 26 with a bandwidth of 0–4 kHz to an analog speech output line 28.

A second low pass filter 30, the special mode filter, with a bandwidth of 0 to above 4 kHz, is connected to parallel with the regular mode low pass filter 18 between the A-to-D converter 14 and the sampler 20 by means of a switch 32. This parallel special mode low pass filter 30 is utilized to pass the passband and the high frequency spectra of fricative sounds on to the sampler 20 in order to obtain aliasing.

In order to determine when fricative sounds are present in the speech, and thus when to switch the switch 32 to connect the output of the special mode low pass filter 30 to the sampler 20, a fricative sound detection circuit 40 is utilized. This detection circuit 40 may be implemented utilizing a variety of detection methods. By way of example, the detection circuit 40 in FIG. 2 computes the power ratio of the signal output from the A-to-D converter 14 to the power output from the regular mode low pass filter 18, i.e., the power in the wide band to the power in the regular narrowband. If this power ratio is less than a predetermined threshold ratio, then it is assumed that fricative sounds are not present in the speech content. If the power ratio is equal to or greater than this given predetermined threshold ratio, then it is assumed that fricative sounds are present and a control signal is generated on line 42 to switch the switch 32 from the terminal 34 to the terminal 36 to thereby connect the special mode low pass filter 30 to system. In the present example the predetermined threshold ratio was calculated by assuming that if the wide band total speech power $P_x(i)$ is less than twice the narrowband partial speech power $P_y(i)$, then no fricative sounds are present. Likewise, it is assumed that if the wide band total speech power $P_x(i)$ is greater than or equal to twice the narrowband partial speech power $P_y(i)$, then fricative sounds are present. Thus, for this example, the predetermined ratio is 2 to 1.

It should be noted that the sampler 20 is a 2-to-1 down sampler which skips every other sample. The sampling rate for the sampler 20 is the Nyquist rate for the passband, i.e. twice the upper frequency limit of the passband or 8 kHz. The 2-to-1 sampling is utilized in order to return the signal to the 0–4 kHz passband. It should be noted that the system started with 0–8 kHz for a passband and this signal must be returned to the 0–4 kHz passband of the narrowband transmission system.

As noted above, the circuit of FIG. 2 may be realized in a digital implementation. There are a variety of digital filters which may be utilized to implement the regular mode filter 18 and the special mode filter 30. In a preferred embodiment, digital linear phase filters may be utilized to implement the filter 18 and 30 in order to obtain the desired control over the frequency response characteristics. Digital linear phase filters are well known in the art and are discussed at length in the reference, *Digital and Sampled-data Control Systems* by Julius T. Tou, McGraw-Hill, 1959.

By way of example, and not by way of limitation, the impulse response of a linear phase filter which may be utilized to implement the filters 18 and 30 is shown below in terms of its Hamming-windowed Fourier series $$h(i) = \begin{cases} G\left[0.54 - 0.46 \cos\left(\frac{2\pi i}{I}\right)\right]\left[0.5 + \sum_{n=1}^{N} \cos n\pi \left(\frac{i}{I} - 0.5\right)\right], & \text{For } 0 \leq i \leq I - 1, \\ 0, & \text{otherwise,} \end{cases}$$

where G is a factor which makes the sum of the impulse response samples equal to unity (i.e., a DC gain of unity). The quantity I is the total number of impulse response samples, which is related to the attenuation rate beyond the cutoff frequency. The quantity N is related to the cutoff frequency for a given value of I. The impulse response is symmetric with respect to the midpoint. Thus the phase response is linear.

The −3 dB cutoff frequency of the normal mode low pass filter is approximately 4 kHz, and the cutoff rate is on the order of −100 dB/octave. Such a filter may be realized by letting I=43 taps for 43 samples and N=22 in Equation (1). The frequency response of this filter is listed in Table 1. The magnitude of the maximum in-band ripple is 0.01 dB. The cutoff frequency of the special mode low pass filter is approximately 4.5 kHz, and the cutoff rate is roughly −60 dB/octave (see Table 1). The special mode filter is obtained by letting I=11 taps for 11 samples and N=7 in Equation (1). The maximum in-band ripple of this filter is 0.04 dB. The impulse responses of both filters are shown in Table 2.

A circuit with the above specified digital filters operates as follows. Initially, the circuit operates in the regular mode of low-pass filter operation. In this the regular mode of low-pass filter operation, the filter 18 with an I=43 and N=22 provides an output which may be expressed by the following equation:

$$y(i) = \sum_{j=1}^{43} x(i-j)h_1(j) = \qquad (2)$$

$$x(i-22)h_1(22) + \sum_{j=1}^{21} [x(i-j) + x(i-44+j)]h_1(j),$$

where x(j) and y(i) are the input and the normal mode low-pass filter outputs, respectively, and 43 taps are utilized. The term $h_1(j)$ is the impulse response of the regular mode low-pass filter 18, as listed in Table 2. This regular mode filtered signal is applied through the switch terminal 34 to the down-sampler 20, and then to the output.

At the same time, both the input energy from the 0–8 kHz band at the input to the regular mode filter 18 and the output energy from the 0–4 kHz band at the output from the regular mode filter 18 are computed in block 40. In the digital embodiment under discussion the input power was calculated with the equation:

$$P_x(i) = P_x(i-1) + [x^2(i) - P_x(i-1)] \div 32$$

and the output power was calculated by the equation:

$$P_y(i) = P_y(i-1) + [y^2(i) - P_y(i-1)] \div 32$$

In essence, the present power value P(i) is equal to the previous power sample P(i) added to the quantity formed by power of the present sample $x^2(i)$ or $y^2(i)$, minus the power of the previous power sample P(i−1), divided by 32. This power computation provides a moving average (smoothing operation) for the power. The dividing number, in this case 32, is set at the sampling rate of 32 samples per second. Note that this averaging or smoothing operation is equivalent to a single-pole filter with a −3 dB cutoff frequency of 40 Hz.

The above described computation may be easily accomplished by a standard digital component setup or by a digital computer, such as the Digital Equipment Corporation model PDP-11. A simple ratio computation $P_x(i)/P_y(i)$ may then be calculated and compared, either in the computer or a comparator, to obtain a power threshold ratio value.

If the power ratio is less than the predetermined threshold ratio, a logic 0, or a low voltage signal in the analog case, is applied as the control signal on line 42 to the switch 32. Such a power ratio indicates that the spectral power in the band where the fricative sound spectra occur is low. Thus, the switch 32 continues to connect the regular mode (0–4 kHz) filter 18 to the sampler circuit 20.

If the power ratio equals or is greater than the predetermined threshold value, then a logic 1, or a positive voltage signal in the analog case, is applied as the control signal on line 42 to the switch 32 to connect contact 36 to the sampler circuit 20. The switching operation is undertaken because such a power ratio indicates that the spectral power in the band where fricative sound spectra occur is high. It should be noted that although a single-pole double-throw switch is shown in FIG. 2, the actual switching operation could be implemented in a computer via proper programming.

As noted previously, the present design was implemented, by way of example, with a power threshold ratio of 2 to 1. Thus, if the total speech power $P_x(i)$ is equal to or greater than twice the partial or narrowband speech power $P_y(i)$ in the passband, then the switch 32 is operated to connect the special mode filter 30 to the sampling circuit 20. The output for the special mode filter 30 in an implementation using I=11 and N=7, may be expressed by the following equation:

$$y(i) = x(i-22)h_2(6) + \sum_{j=1}^{5} [x(i-16-j) + x(i-28+j)]h_2(j),$$

where $h_2(j)$ is the impulse response of the special mode filter 30 as listed in Table 2.

In order to make a smooth transition from one mode to the other, and thus to avoid the clicks caused by one output being slightly advanced or delayed relative to the other, both filter outputs are time-aligned at 22 sampling time-intervals behind the present time (i.e. at the midpoint of the regular mode filter 18 impulse response). Thus, there will be a delay of 22 samples coupled with the delay for the power computation to be made before the switch 32 can be operated to connect the special mode filter 30 to the sampling circuit 20. Accordingly, a certain number of samples containing fricative power spectra may be lost. However fricative sounds last a long time relative to the sampling rate of 16,000 samples per second. Accordingly, the loss of only 22 samples is trivial and undetectable. Moreover, appropriate delays may be added to the circuit to avoid even this trivial fricative power loss.

Figure 1:
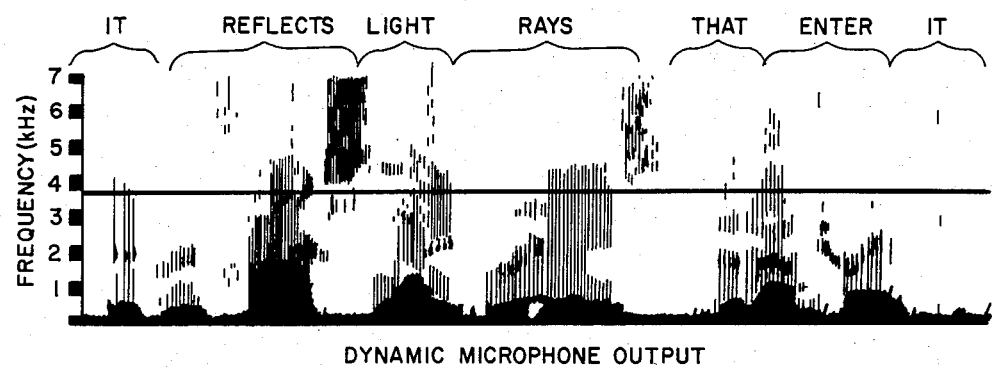
FIG. 1 is a graph of the speech spectra from a dynamic microphone output.
Figure 4:
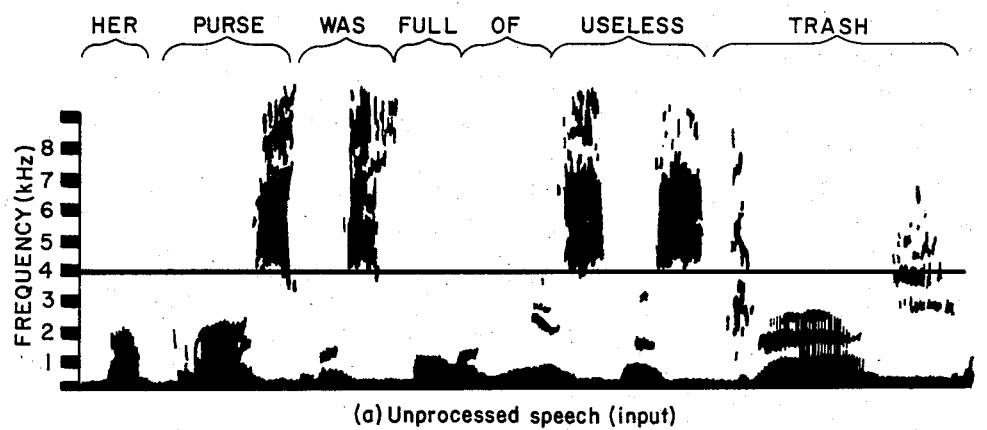
FIG. 4 is a graph of the speech spectra of (a) unprocessed speech, (b) processed speech.
Figure 4:
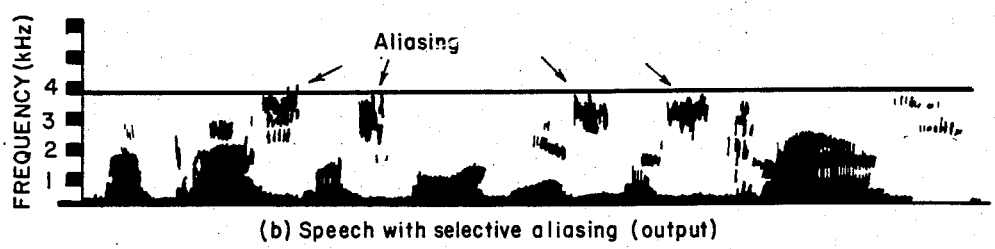

FIG. 4 shows a graph of unprocessed speech which fricative sounds juxtaposed above a graph of speech processed in accordance with the present invention. The spectra folding effect caused by aliasing is quite evident for the /s/ sounds.

Figure 3:
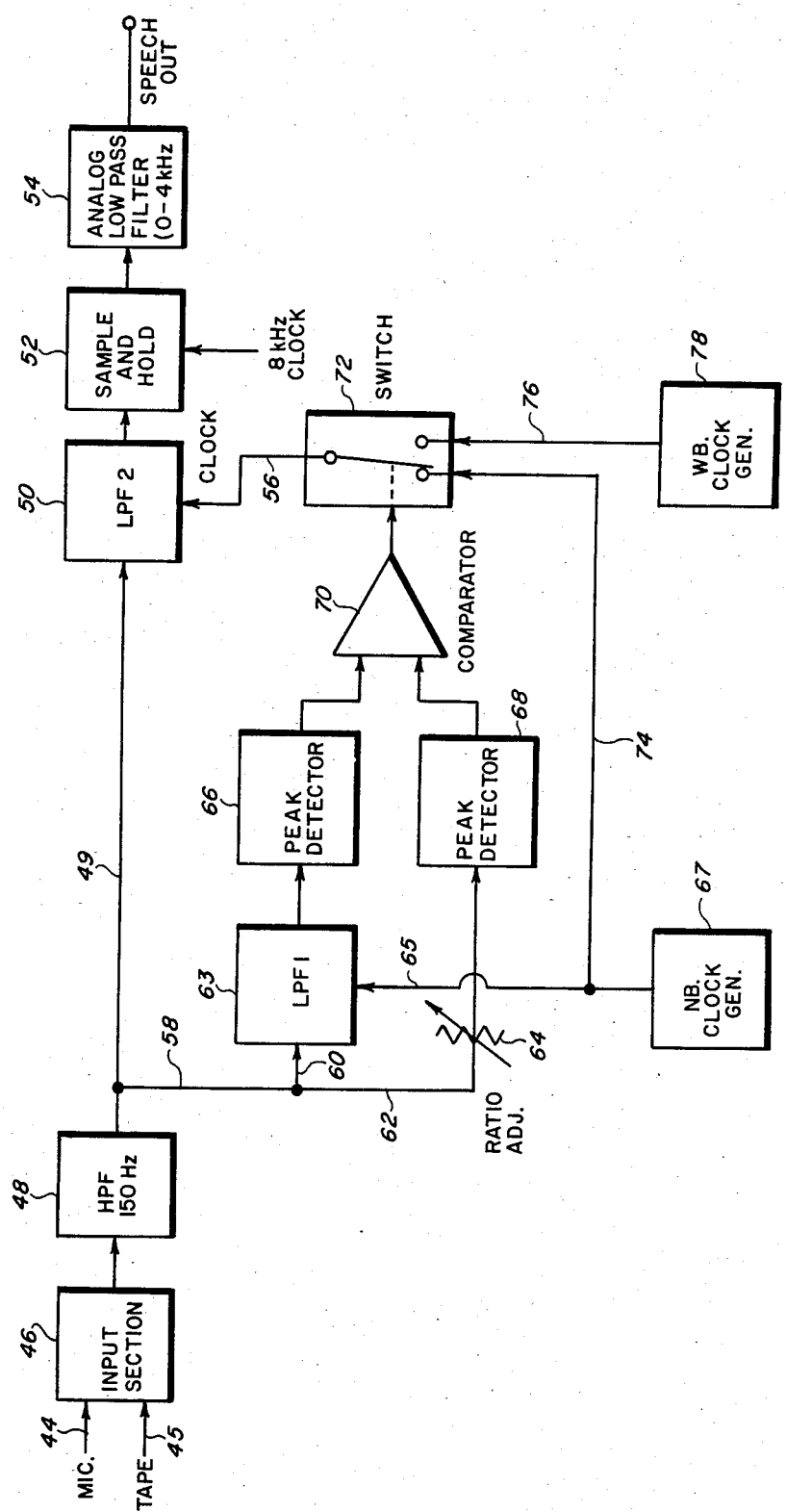
FIG. 3 is a schematic block diagram of a second embodiment of the present invention.

As noted previously, the circuit shown in FIG. 2 can be implemented in either digital or analog form. FIG. 3 shows an analog implementation of a second embodiment which again may be implemented in either digital or analog form. In this implementation, a low pass filter 50 with a variable bandwidth is utilized. In the device actually built, the low pass filter 50 was implemented via an integrated-circuit, switched-capacitor device in which the cutoff frequency for the filter is controlled by the clock signal applied thereto. Thus, the regular mode filter and the special mode filter are obtained simply by utilizing a switch to change the clock frequency to the filter 50. This arrangement avoids switching transients in the output signal.

The variable bandwidth implementation is shown in FIG. 3. The input electrical signals representative of speech are applied initially to an audio input section 46 with inputs 44 and 45 for microphone and tape, respectively. The input section 46 is followed by an optional high pass filter 48 for removing low frequency noise and unnecessary audio energy from the input signal. By way of example, this high pass filter may have a low frequency cutoff of 150 Hz. The signal path then splits after the filter 48. The main path on line 49 leads to the variable bandwidth low pass filter 50, a sample and hold circuit 52, and an analog low pass filter 54. This variable low pass filter 50 may be implemented by an integrated-circuit, switched-capacitor low pass filter, such as, for example, a seven-pole, six-zero elliptic design. An example of such a filter is the EG & G RETICON low pass filter R5609. The slope of the attenuation characteristic above the corner frequency in the present example design approaches 100 dB/octave. This corner frequency is set by a clock frequency supplied thereto via line 56. In this example, the corner frequency is 1/100 of the clock frequency. Normally, the low pass filter 50 is set via the clock signal on line 56 to provide a cutoff frequency in the range from 3600 Hz to 4000 Hz. However, upon the detection of a fricative sound, the cutoff frequency is switched via a change in the clock frequency to a higher frequency.

The other portion of the split signal is applied on line 58 to the control circuitry for detecting fricative sounds and controlling the bandwidth of the low pass filter 50 in accordance therewith. This signal, essentially a full bandwidth signal without the very low frequencies, is applied to two signal paths 60 and 62 in the control circuit. The first path 60 includes a low pass filter 63 with a corner frequency between 3.5 kHz and 4 kHz set via a clock signal on line 65 from the normal band clock generator 67. This filter 63 may be the same type of filter as filter 50. The other path 62 is not filtered, but includes an adjustable attenuator 64. The signals in the paths 60 and 62 are then applied to drive a set of peak detectors 66 and 68, respectively. These detectors 66 and 68 produce D.C. outputs proportional to the peak-to-peak voltages at the detector inputs. The outputs of these detectors 66 and 68 represent the amplitudes of the regular-mode bandwidth-limited and the full bandwidth signals, respectively. These two outputs are applied to a comparator 70 and a comparison is made to determine whether fricative sounds are present. The output signal from comparator 70 is then applied to control a switch 72.

The switch 72 is controllable to apply to line 56 either the normal band clock frequency via line 74 from the NB Clock Generator 67, or a wide band clock frequency via line 76 from a wide band clock generator 78. Conventional digital logic circuits may be used to implement switch 72.

As noted previously, when the wide band signal exceeds the regular mode bandlimited signal by a predetermined ratio, for example, 2 to 1, then it is assumed that a fricative sound is present. In order to implement this predetermined threshold in the control circuit, the attenuator 64 is utilized to adjust the amplitude of the wide band signal on path 62. (Note that the attenator can be used to set the threshold ratio to any value.) This attenuated wide band signal is then compared with the regular mode bandlimited signal in the comparator 70. When the output of the bandlimited detector 66 exceeds the attenuated output from detector 68, the switch 72 is set via a comparator logic signal to send the low clock frequency from the normal band clock generator 67 to control the bandwidth of filter 50. When the attenuated wide band detector 68 output exceeds the bandlimited detector 66 output, then the comparator sends a logic signal to switch the switch 70 to apply the wide band clock signal from the generator 78 to control the bandwidth of filter 50. This wide band clock will be used until the normal frequency relationship resumes.

The two clock generators used in FIG. 3 are adjustable in frequency. In the present example, the clock frequency generated by the NB clock generator 67 may have a range from 300 kHz to 400 kHz, corresponding to filter corner frequencies of 3 kHz to 4 kHz. The wide band clock generator 78 may have a clock frequency range of 350 kHz to 700 kHz corresponding to corner frequencies of 3.5 kHz to 7 kHz.

The actual aliasing operation is again performed by the sample and hold circuit 52 which is clocked at the Nyquist rate, in this case 8 kHz. The low pass filter 54 following the sample and hold circuit 52 limits the output signal to the passband.

In the implementation of FIG. 3, a voltage ratio computation circuit is shown, by way of example. It is, of course, understood that the detection of fricative sounds can be accomplished via the measurement of a variety of parameters including the aforementioned voltage ratio, or power ratio computations.

The actual design utilized to implement the low pass filter 50 is essentially unlimited. However, a reasonably low ripple in the passband and a rapidly increasing attenuation characteristic above the cutoff frequency are desired. In the filter actually constructed for the present example, a ripple of less than 0.2 dB was obtained in the passband and an attenuation approaching 100 dB/octave above the cutoff frequency was realized.

It should be noted that there will be some fricative energy loss before this device switches over to the wide band mode due to the finite time required for the amplitude sensing circuit to operate. However, as noted for the digital embodiment, such loss is trivial in view of the length of time that fricative sounds last.

The invention described above improves the quality and intelligibility of narrowband voice communication systems by spreading the sibilant or fricative sound spectra into the passband without causing distortion of other speech sounds. This spectra spreading is accomplished by detecting the presence of voiceless fricative sound spectra and then folding the high frequency spectra of the fricative sounds into the passband via the aliasing effect. This approach may be used with either analog or digital voice transmission systems.

Inserting this invention in the front-end of a DoD standard narrowband linear predictive coder (LPC) resulted in a marked improvement in intelligibility, particularly with female voices. (The narrowband LPC is a device which converts speech into a digital format for secure communications.) Intelligibility was measured by the Diagnostic Rhyme Test (DRT). This test used the patterns of listeners' identifications of the initial consonants of 196 selected words processed through the system to provide scores for six sound classes and an overall score. The improvements in the scores for one female speaker are shown Table 3. Similar improvements should be realized with other systems, both analog and digital, by enhancing the fricative sounds with this invention.

TABLE 3

Changes in DRT scores for one female speaker realized through the use of the invention. Perfect score is 100.

| Sound Class | Without Invention | With Invention | Change |
|---|---|---|---|
| Voicing | 74.2 | 88.0 | +13.8 |
| Nasality | 98.4 | 96.1 | −2.3 |
| Sustention | 67.2 | 77.1 | +9.9 |
| Sibilation | 78.1 | 82.6 | +4.5 |
| Graveness | 68.7 | 71.1 | +2.4 |
| Compactness | 88.3 | 88.8 | +0.5 |
| Overall | 79.2 | 84.0 | +4.8 |

The filter selection logic works well, despite its simplicity. In this example, it selects the special mode low pass filter only when the total speech power (0–8 kHz) is at least twice the partial speech power (0–4 kHz). Thus, aliasing takes place only for those sounds having predominately high-frequency components. Ambient acoustic noise could possibly interfere with the filter selection logic, but to do so the noise would have to have a strong component between 4 and 5 kHz, and little energy below 4 kHz. None of the noise platforms investigated to date (including tanks, helicopters, ships, and high-performance jets) exhibit these characteristics.

The present invention should have wide applicability in such narrowband systems as telephones, AM radios, CB radios, HAM radios and digitally encoded voice transmitters such as VOCODERS. The invention could be implemented on one or two chips and easily retrofitted on to existing equipment.

TABLE 1

Cut-off characteristics of low-pass filters used.

| Freq. (Hz) | NORMAL MODE | SPECIAL MODE |
|---|---|---|
| 4000 | −3.97 dB | −1.41 dB |
| 5000 | −56.25 | −6.00 |
| 6000 | −62.87 | −16.80 |
| 7000 | −72.46 | −47.85 |

TABLE 2

Impulse responses of low-pass filters.

| NORMAL MODE | | SPECIAL MODE | |
|---|---|---|---|
| Index i | Response $h_1(i)$ | Index i | Response $h_2(j)$ |
| 1 & 43 | 0.00103 | 1 & 11 | −0.00370 |
| 2   42 | 0.00112 | 2   10 | 0.02577 |
| 3   41 | −0.00171 | 3   9 | −0.02245 |
| 4   40 | −0.00174 | 4   8 | −0.08744 |
| 5   39 | 0.00314 | 5   7 | 0.27607 |
| 6   38 | 0.00271 | 6 | 0.62348 |
| 7   37 | −0.00557 | | |
| 8   36 | −0.00396 | | |
| 9   35 | 0.00930 | | |
| 10   34 | 0.00538 | | |
| 11   33 | −0.01479 | | |
| 12   32 | −0.00687 | | |
| 13   31 | 0.02282 | | |
| 14   30 | 0.00829 | | |
| 15   29 | −0.03505 | | |
| 16   28 | −0.00954 | | |
| 17   27 | 0.05581 | | |
| 18   26 | 0.01052 | | |
| 19   25 | −0.10113 | | |
| 20   24 | −0.01113 | | |
| 21   23 | 0.31613 | | |
| 22 | 0.51046 | | |

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A front-end processor for a narrowband voice transmission system with a given passband comprising:
    input means for receiving an electrical signal representing a voice signal;
    means for comparing a parameter such as the voltage or power of the electrical voice signals from said input means to the same parameter of the electrical voice signals within said passband and generating a control signal; and
    means for spreading the spectra of a portion of the electrical voice signals above said passband into said voice transmission system passband in accordance with said control signal if the total of the measured parameter of the signal taken from said input means to the same measured parameter of the signal within said passband has at least a predetermined ratio.

2. A front-end processor as defined in claim 1, wherein said comparing means comprises:
    a first filter having the same bandwidth as said passband for filtering the signal from said input means; and
    a comparison circuit for comparing the measured parameter of the electrical voice signals from said input means to the same measured parameter of the electrical voice signals at the output from said first filter.

3. A front-end processor as defined in claim 2, wherein said spectra spreading means comprises:
    a second filter having a bandwidth including said passband and a frequency band above and contiguous therewith;
    a sampling circuit for sampling at twice the top frequency of said passband; and
    a switching circuit for connecting said first filter to said sampling circuit, unless a control signal is generated and applied thereto from said comparison circuit indicating that the compared signals have a predetermined ratio, then said second filter is connected to said sampling circuit.

4. A front-end processor for narrowband voice transmission system with a given passband comprising:
    input means for receiving electrical signals representing a voice signal;
    a frequency filter circuit with a bandwidth which is variable in accordance with a control signal between said given passband and a bandwidth including said passband and a frequency band above said passband;
    means for determining when the voiceless fricative sounds above said passband exceed the sounds within said passband by a predetermined ratio and generating a control signal in accordance therewith to change the bandwidth of said frequency filter circuit; and
    means for folding some of the spectra of the voiceless fricative sounds above said passband into said passband by means of the aliasing effect when said frequency filter circuit is controlled to have said bandwidth including said passband and said frequency band above said passband.

5. A front-end processor as defined in claim 4, wherein said spectra folding means comprises a sampler sampling at a rate appropriate to said passband.

6. A front-end processor as defined in claim 5, wherein said frequency filter circuit comprises:
- a first passband filter connected to receive a signal from said input means and having a bandwidth approximately the same as said passband;
- a second filter connected to receive a signal from said input means and having a bandwidth including said passband said frequency band above and contiguous with said passband; and
- means for switching the output from one or the other of said first and second filters to said sampler in accordance with the control signal from said determining means.

7. A front-end processor defined in claim 6, wherein said first and second filters are digital low-pass filters.

8. A front-end processor as defined in claim 7, wherein said determining means is a power comparing circuit for comparing the power of the signal at the output from said input means to the power at the output from said first passband filter.

9. A front-end processor as defined in claim 7, wherein said determining means is a voltage comparing circuit for comparing the voltage of the signal at the output from said input means to the voltage at the output from said first passband filter.

10. A front-end processor as defined in claim 8, wherein said input means includes a low pass third filter with a cutoff frequency of twice the top frequency of said passband; and
- an analog-to-digital converter clocked at twice the cutoff frequency of said low pass third filter for A/D converting the signal from said third filter.

11. A front-end processor as defined in claim 5, wherein frequency filter circuit comprises:
- a clocked low pass fourth filter;
- means for generating a first clock signal for clocking said clocked low pass fourth filter to have a cutoff frequency at the top frequency of said passband, and for generating a second clock signal for clocking said clocked low pass fourth filter to have a cutoff frequency to include a band of frequencies above the top frequency of said passband; and
- switching means for switching one or the other of said first and second clock signals to said clocked low pass fourth filter in accordance with said control signal from said determining means to control the upper frequency limit thereof.

12. A front-end processor as defined in claim 11, wherein said determining means comprises:
- a low pass fifth filter with a bandwidth essentially the same as said passband for filtering the output signal from said input means; and
- means for comparing a parameter of the filtered output signal from said low pass fifth filter to the same parameter in the output signal from said input means and generating a predetermined control signal when said compared signals have said predetermined ratio.

13. A front-end processor as defined in claim 12, wherein said comparing means includes;
- a ratio adjusting circuit for adjusting said predetermined ratio; and
- means for comparing the voltage parameter of said compared signals.

14. A front-end processor as defined in claim 13, wherein said comparing means includes:
- a ratio adjusting means for adjusting said predetermined ratio; and
- means for comparing the power parameter of said compared signals.

15. A front-end processor for a narrowband voice transmission system with a given passband comprising:
- an input circuit for receiving a voice signal and converting it into electrical signals;
- a first low pass digital filter connected to receive a signal from said input means and having a bandwidth equal approximately to said passband;
- a second low pass digital filter connected to receive a signal from said input means and having a bandwidth including said passband and a frequency band above and contiguous with said passband;
- a sampler circuit for sampling at a frequency of twice the cutoff frequency of said passband;
- a switching circuit for switching the output from either said first low pass filter or said second low pass filter to said sampler circuit in accordance with a control signal, said switching circuit normally connecting said first low pass filter to said sampler circuit unless a control signal is received activating said switching circult; and
- a comparing circuit for comparing a parameter such as the power or voltage of the signal from said input means to that same parameter of the signals at the output from said first low pass filter and generating a control signal if their ratio exceed a preset threshold to operate said switching circuit to switch said second low pass filter to said sampler circuit.

16. A front-end processor for a narrowband voice transmission system with a given passband comprising:
- an input circuit for receiving a voice signal and converting it into electrical signals;
- a clocked low pass filter connected to said input circuit;
- a sampler circuit connected to the output of said clocked low pass filter for sampling at a frequency of twice the cutoff frequency of said passband;
- means for generating a first clock signal for clocking said clocked low pass filter to have a cutoff frequency at the top frequency of said passband, and for generating a second clock signal for clocking said clocked low pass filter to have a cutoff frequency to include a band of frequencies above said passband;
- a switching circuit for switching either said first or said second clock signal to clock said clocked low pass filter, said switching circuit normally connecting said first clock signal to clock said clocked low pass filter unless a control signal is received activating said switching circuit; and
- a comparing circuit for comparing a parameter such as either the power or voltage of the signal from said input means to the same parameter of the signal within said passband and generating a control signal if their ratio exceeds a preset threshold to operate said switching circuit to switch to said second clock signal.

17. A method of processing electrical signals representative of a voice signal prior to application to a narrowband voice transmission system having a given passband, comprising the steps of:
- receiving an electrical signal representing a voice signal;
- low pass filtering with a cutoff frequency at the top of said passband said received electrical signal;

comparing a parameter such as the power or voltage of the received electrical signals to the same parameter of the low pass filtered electrical signals and generating a control signal if the comparison ratio for this parameter has at least a predetermined value;

if said comparison ratio is at or above said predetermined value, then low pass filtering said received electrical signals with a cutoff frequency to include a band of frequencies above said passband; and sampling said filtered signals at approximately twice the top frequency of said passband such that a portion of the signals above the passband have their spectra spread into said passband.

18. A method of processing electrical signals representative of a voice signal prior to application to a narrowband voice transmission system having a given passband, comprising the steps of:

receiving electrical signals representing a voice signal;

comparing a parameter such as the voltage or power of the received electrical voice signals to the same parameter of these signals within said passband and generating a control signal; and spreading the spectra of a portion of the electrical voice signals above said passband into said voice transmission system passband in accordance with said control signal if a comparison of the measured parameter of the total received electrical voice signals to the measured parameter of the signals within said passband has a predetermined ratio.

* * * * *